United States Patent
Yamamoto et al.

(10) Patent No.: US 10,589,560 B2
(45) Date of Patent: Mar. 17, 2020

(54) ACTIVE ENERGY RAY CURING INKJET INK, PRINTED PRODUCT, INKJET PRINTING APPARATUS, AND INKJET PRINTING METHOD

(71) Applicants: DUPLO CORPORATION, Kanagawa (JP); ASIA STENCIL PAPER CO., LTD., Gifu (JP)

(72) Inventors: Shuhei Yamamoto, Kanagawa (JP); Kazuhiro Tanaka, Gifu (JP); Tomohiko Niwa, Gifu (JP); Kazuki Imai, Gifu (JP)

(73) Assignees: DUPLO CORPORATION, Kanagawa (JP); ASIA STENCIL PAPER CO., LTD., Gifu (JP)

( * ) Notice: Subject to any disclaimer, the term of this patent is extended or adjusted under 35 U.S.C. 154(b) by 0 days.

(21) Appl. No.: 16/118,052

(22) Filed: Aug. 30, 2018

(65) Prior Publication Data
US 2019/0061403 A1  Feb. 28, 2019

(30) Foreign Application Priority Data

Aug. 31, 2017 (JP) ................................ 2017-188066
Aug. 28, 2018 (JP) ................................ 2018-159463

(51) Int. Cl.
| | |
|---|---|
| *B41M 7/00* | (2006.01) |
| *B41J 2/01* | (2006.01) |
| *C09D 11/101* | (2014.01) |
| *C09D 11/38* | (2014.01) |
| *C08F 2/50* | (2006.01) |
| *C09D 11/322* | (2014.01) |
| *C09D 11/104* | (2014.01) |
| *C08F 2/48* | (2006.01) |

(Continued)

(52) U.S. Cl.
CPC ............. *B41M 7/0081* (2013.01); *B41J 2/01* (2013.01); *C08F 2/48* (2013.01); *C08F 2/50* (2013.01); *C09D 11/101* (2013.01); *C09D 11/104* (2013.01); *C09D 11/322* (2013.01); *C09D 11/38* (2013.01); *B41J 11/002* (2013.01); *C09D 11/326* (2013.01)

(58) Field of Classification Search
CPC .. B41M 7/0081; B41J 3/00; B41J 2/01; C08F 2/48; C08F 2/50; C09D 11/322; C09D 11/101; C09D 11/104; C09D 11/38; C09D 11/326
See application file for complete search history.

(56) References Cited

FOREIGN PATENT DOCUMENTS

| EP | 2277956 A1 * | 1/2011 | ............ C09D 11/101 |
|---|---|---|---|
| FR | 2828203 A1 * | 2/2003 | ............ C09D 11/101 |

OTHER PUBLICATIONS

IP.com search (Year: 2019).*

(Continued)

*Primary Examiner* — Lisa Solomon
(74) *Attorney, Agent, or Firm* — Ladas & Parry LLP

(57) ABSTRACT

This invention forms a good unrepellent uniform coating film and an image having neither image missing nor image blur by using an inkjet printing method. Active energy ray curing inkjet ink contains (A) an active energy ray curing monomer and/or an active energy ray curing oligomer, (B) a photopolymerization initiator, and (C) a surface tension adjusting agent, and has a viscosity of 3.0 to 6.0 mPa·s at 35° C.

10 Claims, 7 Drawing Sheets
(2 of 7 Drawing Sheet(s) Filed in Color)

(51) Int. Cl.
*C09D 11/326* (2014.01)
*B41J 11/00* (2006.01)

(56) References Cited

OTHER PUBLICATIONS

Machine Translation of FR 2 828 203 A1, Cacagne Pierre et al, Ink useful for inkjet printing comprises a pigment suspended in a vehicle, Feb. 7, 2003, pp. 2-4 (Year: 2003).*
J-PlatPat English abstract for JP 2007-31667 A.

* cited by examiner

ACTIVE ENERGY RAY CURING INKJET INK, PRINTED PRODUCT, INKJET PRINTING APPARATUS, AND INKJET PRINTING METHOD

CROSS REFERENCE TO RELATED APPLICATIONS

This application is based upon and claims the benefit of priority from Japanese patent application No. 2017-168066, filed on Aug. 31, 2017, and Japanese patent application No. 2018-159463, filed on Aug. 28, 2018, the disclosures of all of which are incorporated herein in their entireties by reference.

BACKGROUND OF THE INVENTION

Field of the Invention

The present invention relates to active energy ray curing inkjet ink, a printed product, an inkjet printing apparatus, and an inkjet printing method.

Description of the Related Art

In the abovementioned technical field, patent literature 1 has disclosed a technique related to an energy ray curing inkjet printing clear ink composition capable of forming an overcoat layer on an image formed by an inkjet printing method.

[Patent Literature 1] Japanese Patent Laid-Open No. 2007-31667

SUMMARY OF THE INVENTION

Unfortunately, an image formed by using the energy ray curing inkjet printing clear ink composition described in patent literature 1 has the technical problem that the quality of the formed image deteriorates as will be explained below.

An image which is formed by an inkjet printing method by using the energy ray curing inkjet printing clear ink composition is formed by landing a dot made of the abovementioned clear ink composition on a printing target object. Generally, image dot missing and image line missing occur in an image formed by the inkjet printing method.

Depending on a printing target object, a dot made of the abovementioned clear ink composition is sometimes repelled on the printing target object. Also, dots made of the abovementioned clear ink composition land on a printing target object but are sometimes repelled, so no image can be formed because neither lines nor planes are formed. As a consequence, missing of the clear ink composition dots occurs on the printing target object, and this missing of the clear link composition dots causes image dot missing on the printing target object.

Furthermore, if repellence of the abovementioned clear ink composition dots significantly occurs on the printing target object, a portion of the formed image that should supposed to be form a solid portion, forms dot patterns.

In addition, a blur occurs in an image formed by the inkjet printing method by using the abovementioned clear ink composition. Depending on a printing target object, a dot made of the abovementioned clear ink composition cannot hold its form constant after having landed on the printing target object.

Accordingly, a dot of the abovementioned clear ink composition sometimes spreads on a printing target object. This spread of the inkjet ink dot landed on the printing target object causes a blur. This blur extends an image to be formed, so the image to be formed becomes unclear. Especially when an image to be formed by the inkjet method is a character, this character becomes unclear and unreadable.

Furthermore, an image to be formed by the inkjet printing method is sometimes formed by using an inkjet printing apparatus including a plurality of line heads. The plurality of line heads of the inkjet printing apparatus include a nozzle incapable of ejecting inkjet ink due to a failure such as clogging of inkjet ink. The existence of the nozzle like this causes linear image missing (line missing) in the conveying direction of a printing target object.

As described above, an image formed by using the energy ray curing inkjet printing clear ink composition described in patent literature 1 has the technical problem that the quality of the image deteriorates due to image dot missing, image line missing, and image blur. The present invention enables to provide a technique which solves the above-described problem.

One example aspect of the present invention provides active energy ray curing inkjet ink containing components (A) to (C) below: (A) an active energy ray curing monomer and/or an active energy ray curing oligomer; (B) a photopolymerization initiator; and (C) a surface tension adjusting agent, and having a viscosity of 3.0 to 6.0 mPa·s at 35° C.

Another example aspect of the present invention provides an inkjet printing apparatus including a conveyance element that conveys a substrate, an inkjet head that ejects active energy ray curing inkjet ink from nozzles toward the substrate conveyed by the conveyance element, the active energy ray curing inkjet ink containing components (A) to (C) below: (A) an active energy ray curing monomer and/or an active energy ray curing oligomer, (B) a photopolymerization initiator, and (C) a surface tension adjusting agent, and having a viscosity of 3.0 to 6.0 mPa·s at 35° C., and an active energy source that irradiates, with an active energy ray, the substrate coated with the active energy ray curing inkjet ink ejected from the inkjet head, while holding a temperature at 35° C. to 40° C. when the active energy ray curing inkjet ink is ejected from the inkjet head.

Still other example aspect of the present invention provides an inkjet printing method including conveying a substrate by a conveyance element, ejecting active energy ray curing inkjet ink toward the substrate conveyed by the conveyance element by using an inkjet head including nozzles facing the substrate, the active energy ray curing inkjet ink containing components (A) to (C) below: (A) an active energy ray curing monomer and/or an active energy ray curing oligomer, (B) a photopolymerization initiator, and (C) a surface tension adjusting agent, and having a viscosity of 3.0 to 6.0 mPa·s at 35° C., coating the substrate with the active energy ray curing inkjet ink, and curing the active energy ray curing inkjet ink by irradiating the substrate coated with the active energy ray curing inkjet ink with an active energy ray.

According to the present invention, a printed image having neither missing nor blur is formed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

<Active Energy Ray Curing Inkjet Ink and Printed Product>

Figure 1:
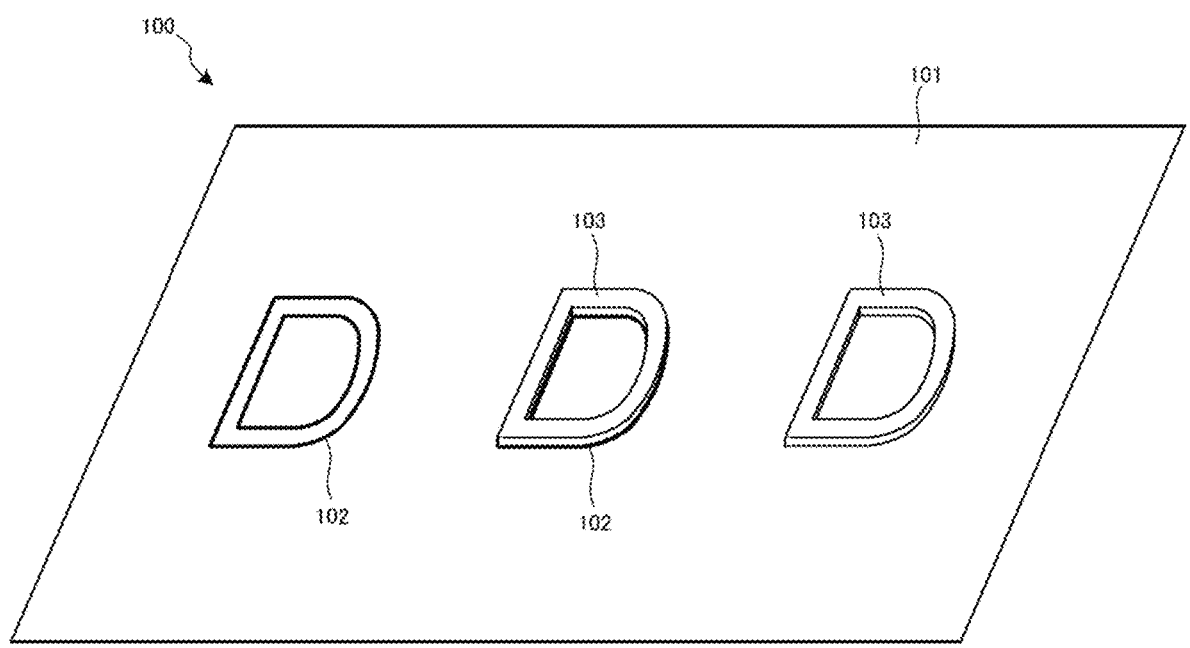
FIG. 1 is a perspective view of a printed product manufactured by using active energy ray curing inkjet ink according to an example embodiment of the present invention.

FIG. 1 is a perspective view of a printed product 100 manufactured by using active energy ray curing inkjet ink of this example embodiment. As shown in FIG. 1, active energy ray curing inkjet ink 103 is formed on a substrate 101 by an inkjet method by using an inkjet printing apparatus or the like. The active energy ray curing inkjet ink 103 formed on the substrate 101 has a shape obtained by horizontally writing roman letters D. As shown in FIG. 1, the active energy ray curing inkjet ink 103 can be printed directly on the substrate 101, and can also be printed on base printing 102 formed on the substrate in advance by horizontally writing the roman letters D.

In FIG. 1, the active energy ray curing inkjet ink 103 printed on the base printing 102 is accurately applied on the base printing 102. When the substrate 101 is viewed from a plane, the active energy ray curing inkjet ink 103 has almost the same shape as that of the base printing 102. When the substrate 101 is viewed from a section, the active energy ray curing inkjet ink 103 has a three-dimensional shape maintaining almost the same shape as that of the base printing 102 in the vertical direction of the substrate 101.

That is, the active energy ray curing inkjet ink 103 has no "blur" in the relationship with the substrate 101, and hence has the three-dimensional shape rising in the vertical direction while maintaining almost the same shape as that of the base printing 102. The boundary between the substrate 101 not coated with the active energy ray curing inkjet ink 103 and the substrate 101 on which the base printing 102 is coated with the active energy ray curing inkjet ink 103 is clearly formed along the base printing 102.

As a consequence, the contour of an image of the base printing 102 forming the printed product 100 shown in FIG. 1 becomes sharp.

Also, in FIG. 1, the active energy ray curing inkjet ink 103 is directly applied on the substrate 101 without being through the base printing 102. The active energy ray curing inkjet ink 103 forms a uniform coating film within a predetermined range on the substrate 101 when the substrate 101 is viewed from a plane, and has a three-dimensional shape having a predetermined thickness in a direction perpendicular to the substrate 101 when the substrate 101 is viewed from a section.

That is, in the relationship with the substrate 101, the active energy ray curing inkjet ink 103 maintains almost the same shape as the shape of the coating film formed within the predetermined range on the substrate 101, and has the three-dimensional shape rising in the vertical direction.

More specifically, the active energy ray curing inkjet ink of this example embodiment can overcoat not only the substrate, but also the base printing formed on the substrate in advance by being applied on the base printing via the base printing. In particular, the active energy ray curing inkjet ink of this example embodiment can preferably be used as overcoating inkjet ink capable of accentuating the design of an image formed by the base printing formed on the substrate in advance by overcoating the base printing.

The substrate 101 can be a material on which the active energy ray curing inkjet ink 103 can directly be printed. The substrate 101 can also be a material on which base printing can be formed in advance. As the substrate 101, it is possible to use, e.g., printing paper such as plain paper, art paper, photographic paper, business card paper, postcard, coated paper, matt coated paper, pure paper, and special paper, plastic substrates such as polycarbonate, rigid polyvinyl chloride, flexible polyvinyl chloride, polystyrene, foamed styrol, PMMA, polypropylene, polyethylene, and PET, laminated films obtained by laminating these plastic substrates, materials obtained by mixing or modifying these plastic substrates, glass, metal substrates such as stainless steel, and wood. However, the present invention is not limited to these materials.

Ink for use in the base printing 102 is not particularly limited as long as the ink can be printed on the substrate 101 and overcoated with the active energy ray curing inkjet ink 103, and can be full-color printing ink or monochrome printing ink. A method of printing the base printing 102 is also not particularly limited and can be an inkjet printing method, toner printing method, or the like.

The active energy ray curing inkjet ink of this example embodiment will be explained below. The active energy ray curing inkjet ink has the technical features that the ink contains components (A) to (C): (A) an active energy ray curing monomer and/or active energy ray curing oligomer; (B) a photopolymerization initiator; and (C) a surface tension adjusting agent, and has a viscosity of 3.0 to 6.0 mPa·s at 35° C. A temperature of 35° C. as a criterion for measuring the viscosity of the active energy ray curing inkjet ink is the set temperature of an inkjet head of an inkjet printing apparatus. A temperature at which the active energy ray curing inkjet ink is ejected from the inkjet head is 35° C.

Note that the set temperature of the inkjet head is held at about 35° C. by using a temperature holding member such as a heater. By thus holding the set temperature of the inkjet head at about 35° C., the active energy ray curing inkjet ink can stably be applied on the substrate. Consequently, it is possible to obtain a uniform coating film made of the active energy ray curing inkjet ink and a high-quality image on the substrate.

The viscosity of the active energy ray curing inkjet ink is 3.0 to 6.0 mPa·s at 35° C. This viscosity range at 35° C. is a numerical value within a range extremely lower than the viscosity of inkjet ink used as regular inkjet ink, and is a viscosity range not used as regular inkjet ink.

That is, since the viscosity range is set at a low viscosity, the active energy ray curing inkjet ink of this example embodiment is ink which is very stable when ejected from an inkjet head, and excellent in self-leveling properties. In addition, an image formed by using the active energy ray curing inkjet ink has neither image dot missing nor image line missing, and does not deteriorate the image quality due to image blur.

That is, the active energy ray curing inkjet ink of this example embodiment forms a good non-repellent uniform coating film, and an image having nether image dot missing nor image line missing.

Also, even when a nozzle incapable of ejecting ink exists in a plurality of inkjet heads of an inkjet printing apparatus, the self-leveling properties of the active energy ray curing inkjet ink itself can prevent image dot missing and image line missing of an image.

The viscosity of the active energy ray curing inkjet ink at 35° C. is preferably 3.0 mPa·s or more because the tracking properties of ejection of the ink do not decrease and the ejection stability of the ink improves, and preferably 6.0 mPa·s or less because the self-leveling properties of the ink improve.

Furthermore, the viscosity of the active energy ray curing inkjet ink is 4.5 to 9.0mPa·s, and more preferably 5.0 to 8.0 mPa·s at 25° C. This viscosity range at 25° C. is a value extremely lower than the viscosity of inkjet ink used as regular inkjet ink.

A temperature of 25° C. as a criterion for measuring the viscosity of the active energy ray curing inkjet ink is equivalent to the manufacturing temperature of the ink. For the active energy ray curing inkjet ink of this example embodiment, adjusting the viscosity of the ink is most important. Therefore, defining the viscosity of the ink at 25° C. as the manufacturing temperature of the ink has a technical meaning.

The viscosity of the active energy ray curing inkjet ink at 25° C. is preferably 4.5 mPa·s or more because the ejection stability of the ink further improves, and preferably 9.0 mPa·s or less because the self-leveling properties of the ink further improve.

The surface tension of the active energy ray curing inkjet ink is adjusted by taking account of the wettability to the substrate, good droplet formability after the ink is ejected, and the quality of an image to be formed when the droplet is landed on the substrate and cured by irradiation with an energy ray. The surface tension of the active energy ray curing inkjet ink of this example embodiment is adjusted to 19 to 33 mN/m. This surface tension is adjusted within a predetermined range by using the surface tension adjusting agent of the component (C), and appropriately changing the type and content of the agent, in accordance with each substrate.

The surface tension of the active energy ray curing inkjet ink is adjusted by taking account of the relationship with the surface tension of each substrate.

The surface tension of the active energy ray curing inkjet ink of this example embodiment is set to be lower than that of the substrate. By thus setting the surface tension of the active energy ray curing inkjet ink to be lower than that of the substrate, it is possible to obtain a good coating film by the active energy ray curing inkjet ink in accordance with the type of the substrate.

It is important that the surface tension of the substrate and that of the active energy ray curing inkjet ink have the following relationship.

Letting $[X]$ mN/m be the surface tension of the substrate and $[Y]$ mN/m be the surface tension of the active energy ray curing inkjet ink, adjustment must be performed such that the difference between the surface tension $[X]$ mN/m of the substrate and the surface tension $[Y]$ mN/m of the active energy ray curing inkjet ink is 1.0 to 15.0 mN/m. Adjustment is more preferably performed such that the difference between the surface tension $[X]$ mN/m of the substrate and the surface tension $[Y]$ mN/m of the active energy ray curing inkjet ink is 5.0 to 12.0 mN/m.

The difference between the surface tension $[X]$ mN/m of the substrate and the surface tension $[Y]$ mN/m of the active energy ray curing inkjet ink is preferably 1.0 mN/m or more because it is possible to improve the ejection stability of the ink and suppress repellence of the ink on the substrate.

Also, the difference between the surface tension $[X]$ mN/m of the substrate and the surface tension $[Y]$ mN/m of the active energy ray curing inkjet ink is preferably 15.0 mN/m or less because it is possible to control a spread of the ink in order to maintain the clearness and resolution of an image formed by the ink and as a consequence suppress a blur of the image.

That is, the relationship between the surface tension $[X]$ mN/m of the substrate and the surface tension $[Y]$ mN/m of the active energy ray curing inkjet ink is represented by the following expression.

$$1.0<[X]-[Y]<15.0 \text{ mN/m}$$

As described above, the active energy ray curing inkjet ink of this example embodiment defines the surface tension of the substrate in order to implement overcoat printing by achieving best matching with the substrate or with the substrate including the base printing on the substrate.

The individual components of the active energy ray curing inkjet ink of this example embodiment will be explained below.

[Component (A): Active Energy Ray Curing Monomer]

The active energy ray curing inkjet ink of this example embodiment contains the component (A). An active energy ray curing monomer as the component (A) contained in the active energy ray curing inkjet ink is a component which is cured by a polymerization reaction when applied on a substrate and irradiated with an active energy ray. Note that the active energy ray is an energy ray such as an ultraviolet ray (UV) or electron beam (EB).

The active energy ray curing monomer is not particularly limited as long as the monomer easily causes a polymerization reaction when irradiated with the active energy ray. For example, the active energy ray curing monomer can be either a monofunctional active energy ray curing monomer or polyfunctional active energy ray curing monomer.

Also, the component (A) contained in the active energy ray curing inkjet ink can contain an active energy ray curing oligomer. The component (A) contained in the active energy ray curing inkjet ink can also contain only an active energy ray curing oligomer.

More specifically, examples of the monofunctional active energy ray curing monomer are monoacrylates such as butylcyclohexanol acrylate, isobornyl acrylate, 2-methyl-2-ethyl-1,3-dioxolan-4-ylmethylacrylate, tetrahydrofulfuryl acrylate, cyclohexyl acrylate, benzyl acrylate, methylphenoxyethyl acrylate, 4-t-butylcyclohexyl acrylate, caprolactone modified tetrahydrofulfuryl acrylate, tribromophenyl acrylate, ethoxylated tribromophenyl acrylate, 2-phenoxyethyl acrylate, phenoxypolyethyleneglycol acrylate, phenoxypolypropyleneglycol acrylate, phenoxypolyethylenepolypropyleneglycol acrylate, acryloylmorpholine, phenoxydiethyleneglycol acrylate, 2-hydroxy-3-phenoxypropyl acrylate, 1,4-cyclohexanedimethanol monoacrylate, 2-hydroxyethyl acrylate, 2-hydroxypropyl acrylate, 4-hydroxybutyl acrylate, isobutyl acrylate, t-butylacrylate, isooctyl acrylate, 2-methoxyethyl acrylate, methoxytriethyleneglycol acrylate, 2-ethoxyethyl acrylate, 3-methoxybutyl acrylate, ethoxyethoxyethyl acrylate, butoxyethyl acrylate, ethoxydiethyleneglycol acrylate, methoxydipropyleneglycol acrylate, dipropyleneglycol acrylate, β-carboxylethyl acrylate, ethyldiglycol acrylate, trimethylolpropaneformal monoacrylate, imide acrylate, isoamyl acrylate, ethoxylated succinic acid acrylate, trifluoroethyl acrylate, and ω-carboxypolycaprolactone monoacrylate. However, the present invention is not limited to these examples.

Furthermore, of these monoacrylates, it is possible to more preferably use, e.g., butylcyclohexanol acrylate, isobornyl acrylate, 2-methyl-2-ethyl-1,3-dioxolan-4-ylmethyl acrylate, tetrahydrofulfuryl acrylate, cyclohexyl acrylate, methylphenoxyethyl acrylate, and 2-phenoxyethyl acrylate, as active energy ray curing monomers by which the viscosity of the active energy ray curing inkjet ink can be set at 3.0 to 6.0 mPa·s at 35° C. and which is highly suitable as inkjet ink.

Note that it is possible to use these monofunctional active energy ray curing monomers singly or by selectively combining two or more types thereof.

Examples of the polyfunctional active energy ray curing monomer are diacrylates such as dipropyleneglycol diacrylate, tripropyleneglycol diacrylate, butanediol diacrylate, dimethylol-tricyclodecan diacrylate, propoxylated bisphenol A di(meth)acrylate, ethoxylated bisphenol A di(meth) acrylate, cyclohexanedimethanol di(meth)acrylate, dimethylol dicyclopentane diacrylate, ethyleneglycol di(meth) acrylate, diethyleneglycol di(meth)acrylate, polyethyleneglycol di(meth)acrylate, 1,6-hexanediol di(meth)acrylate, ethoxylated 1,6-hexanediol diacrylate, neopentylglycol di(meth)acrylate, polypropyleneglycol diacrylate, 1,4-butanediol di(meth)acrylate, 1,9-nonanediol diacrylate, tetraethyleneglycol diacrylate, 2-n-butyl-2-ethyl-1,3-propanediol diacrylate, hydroxy pivalic acid neopentylglycol diacrylate, 1,3-butyleneglycol di(meth)acrylate, ethoxylated tripropyleneglycol diacrylate, neopentylglycol modified trimethylolpropane diacrylate, stearic acid modified pentaerythritol diacrylate, ethoxylated neopentylglycol di(meth) acrylate, propoxylated neopentylglycol di(meth)acrylate, and tripropyleneglycol di(meth)acrylate. However, the present invention is not limited to these examples.

Other examples of the polyfunctional active energy ray curing monomer are triacrylates, tetraacrylates, hexaacrylates, and oligoacrylates such as trimethylolpropane triacrylate, hydroxy pivalic acid trimethylolpropane triacrylate, ethoxylated phosphoric acid triacrylate, ethoxylated isocyanuric acid triacrylate, tri(2-hydroxyethylisocyanurate)triacrylate, pentaerythritol triacrylate, tetramethylolpropane triacrylate, tetramethylolmethane triacrylate, caprolactone modified trimethylolpropane triacrylate, propoxylateglyceryl triacrylate, ethoxylated trimethylolpropane triacrylate, propoxylated trimethylolpropane triacrylate, pentaerythritol tetraacrylate, tetramethylolmethane tetraacrylate, pentaerythritol tetraacrylate, ditrimethylolpropane tetraacrylate, ethoxylated pentaerythritol tetraacrylate, dipentaerythritolhydroxy pentaacrylate, dipentaerythritol hexaacrylate, caprolactone modified dipentaerythritol hexaacrylate, neopentylglycol oligoacrylate, 1,4-butanediol oligoacrylate, 1,6-hexanediol oligoacrylate, trimethylolpropane oligoacrylate, and pentaerythritol oligoacrylate. However, the present invention is not limited to these examples.

Furthermore, of these diacrylates, it is possible to more preferably use dipropyleneglycol diacrylate and butanediol diacrylate as active energy ray curing monomers by which the viscosity of the active energy ray curing inkjet ink can be set at 3.0 to 6.0 mPa·s at 35° C. and which is highly suitable as inkjet ink.

Note that these monofunctional active energy ray curing monomers can be used singly or by selectively combining two or more types thereof. Note also that it is possible to use, as needed, the monofunctional active energy ray curing monomers and polyfunctional active energy ray curing monomers singly or by combining the monofunctional active energy ray curing monomer and polyfunctional active energy ray curing monomer.

Assuming that the content of the whole active energy ray curing monomer of the component (A) is 100 parts by weight, the composition ratios of the active energy ray curing monomer are preferably set such that the content of the monofunctional active energy ray curing monomer is 50 to 90 parts by weight and the content of the polyfunctional active energy ray curing monomer is 50 to 10 parts by weight. The content of the monofunctional active energy ray curing monomer is preferably 50 parts by weight or more because shrinkage decreases when the active energy ray curing inkjet ink is cured, and preferably 90 parts by weight or less because the viscosity of the active energy ray curing inkjet ink can be decreased.

In addition, the active energy ray curing monomer of the component (A) can contain an active energy ray curing oligomer and/or a polymer such as acryl, polyester, or polyol. When the active energy ray curing monomer of the component (A) contains an active energy ray curing oligomer and/or a polymer such as acryl, polyester, or polyol, it is possible to give the active energy ray curing inkjet ink curability, flexibility, a scratch resistance, and adhesion to a substrate.

Examples of the active energy ray curing oligomer are an oligomer formed from the abovementioned active energy ray curing monomer, epoxy (meth)acrylate, oxetane (meth) acrylate, cyclic or straight-chain aliphatic urethane (meth) acrylate, aromatic urethane (meth)acrylate, polyether (meth) acrylate, and polyester (meth)acrylate. However, the present invention is not limited to these examples.

The active energy ray curing inkjet ink of this example embodiment has the feature that the viscosity is 3.0 to 6.0 mPa·s at 35° C., so the molecular weight of the active energy ray curing oligomer of the component (A) is preferably about 1,000.

[Component (B): Photopolymerization Initiator]

The active energy ray curing inkjet ink of this example embodiment contains the component (B). The photopolymerization initiator forming the component (B) is a component which initiates a polymerization reaction of the active energy ray curing monomer applied on the substrate.

The photopolymerization initiator is not particularly limited as long as it is a component capable of easily initiating a polymerization reaction of the active energy ray curing monomer when the monomer is irradiated with an active energy ray such as an ultraviolet ray.

When the active energy ray curing inkjet ink of this example embodiment initiates a polymerization reaction when irradiated with an ultraviolet ray, it is possible to adopt a molecular-cleavage-type photopolymerization initiator or hydrogen-drawing-type photopolymerization initiator.

Examples of the molecular-cleavage-type photopolymerization initiator are benzoin isobutylether, 2,4-diethylthioxanthone, 2-isopropylthioxanthonebenzyl, 2,4,6-trimethylbenzoyldiphenylphosphine oxide, 2-benzyl-2-dimethylamino-1-(4-morpholinophenyl)-butane-1-one, and bis(2,6-dimethoxybenzoyl)-2,4,4-trimethylpentylphosphine oxide. However, the present invention is not limited to these examples.

From the viewpoint of activity, it is also possible to use, e.g., 1-hydroxycyclohexylphenylketone, benzoinethylether, benzyldimethylketal, 2-hydroxy-2-methyl-1-phenylpropane-1-one, 1-(4-isopropylphenyl)-2-hydroxy-2-methylpropane-1-one, and 2-methyl-1-(4-methylthiophenyl)-2-morpholinopropane-1-one, as the molecular-cleavage-type photopolymerization initiator.

Examples of the hydrogen-drawing-type photopolymerization initiator are benzophenone, 4-phenylbenzophenone, isophthalphenone, and 4-benzoyl-4'-methyl-diphenyl sulfide, but the present invention is not limited to these examples.

These photopolymerization initiators preferably contain two or more types of photopolymerization initiators, i.e., a photopolymerization initiator having an absorption maximum wavelength on the long-wavelength side, and a photopolymerization initiator having an absorption maximum wavelength on the short-wavelength side.

This is so because the use of two or more types of photopolymerization initiators allows the active energy ray curing inkjet ink to efficiently use an active energy ray generated from an inkjet printing apparatus.

Consequently, a dot made of the active energy ray curing inkjet ink can cure within a short time period after landing, thereby preventing a blur of an image to be formed.

The content of the photopolymerization initiator of the component (B) is 1.0 to 20.0 parts by weight, preferably, 3.0 to 10.0 parts by weight with respect to 100 parts by weight of the active energy ray curing monomer. The photopolymerization initiator of the component (B) can contain a polymerization inhibitor from the viewpoints of the storage stability of the active energy ray curing inkjet ink, and the stability of an inkjet head of an inkjet printing apparatus in use.

That is, the polymerization inhibitor is contained in the photopolymerization initiator of the component (B) in order to prevent clogging of an inkjet head caused by a polymer generated when the active energy ray curing monomer is heated. When the polymerization inhibitor is contained in the photopolymerization initiator of the component (B), the active energy ray curing inkjet ink is stably ejected from an inkjet head even when heated. More specifically, examples of the polymerization inhibitor are hydroquinone, p-methoxyphenol, t-butylcatechol, pyrogallol, and butylhydroxytoluene, but the present invention is not limited to these examples.

The content of the polymerization inhibitor is preferably 0.01 to 5.0 parts by weight with respect to 100 parts by weight of the active energy ray curing inkjet ink.

The content of the polymerization inhibitor is preferably 0.01 part by weight or more because the curing of the active energy ray curing inkjet ink can be suppressed. The content of the polymerization inhibitor is preferably 5.0 parts by weight or less because the curing of the active energy ray curing inkjet ink progresses when the ink is irradiated with an active energy ray.

The photopolymerization initiator of the component (B) can also contain a sensitizer in order to increase the photosensitivity of the active energy ray curing monomer.

Examples of the sensitizer are trimethylamine, methyldimethanolamine, triethanolamine, p-diethylaminoacetophenone, p-dimethylamino ethyl benzoate, p-dimethylamino isoamyl benzoate, N,N-dimethylbenzylamine, and 4,4'-bis(diethylamino)benzophenone, but the present invention is not limited to these examples. The sensitizer is given by amines which do not cause any addition reaction with the active energy ray curing monomer.

The content of the sensitizer is preferably 0.01 to 5.0 parts by weight with respect to 100 parts by weight of the active energy ray curing inkjet ink.

The content of the sensitizer is preferably 0.01 part by weight or more because the photosensitivity of the active energy ray curing monomer can be increased. The content of the sensitizer is preferably 5.0 parts by weight or less because the polymerization of the active energy ray curing inkjet ink can properly be advanced when the ink is irradiated with an active energy ray.

Note that the photopolymerization initiator, sensitizer, and polymerization inhibitor forming the component (B) are preferably materials which have high solubility to the active energy ray curing monomer contained in the active energy ray curing inkjet ink, and do not prevent an active energy ray such as an ultraviolet ray from penetrating through the active energy ray curing monomer.

[Component (C): Surface Tension Adjusting Agent]

The active energy ray curing inkjet ink of this example embodiment contains the component (C). Examples of the surface tension adjusting agent forming the component (C) are organic solvents such as alcohols and glycol ethers, an ionic surfactant, a nonionic surfactant, and modified silicone oil to adjust the surface tension of the active energy ray curing inkjet ink to the predetermined range. The surface tension adjusting agent is not particularly limited as long as the agent can adjust the surface tension of the active energy ray curing inkjet ink, improves the self-leveling properties, and does not deteriorate the properties of the ink. As the surface tension adjusting agent, an ionic surfactant and nonionic surfactant are favorable because then cay adjust the surface tension by the addition of small amounts.

Examples of the ionic surfactant are an anionic surfactant, cationic surfactant, and zwitterionic active agent.

Examples of the anionic surfactant of the ionic surfactant are fatty acid salts such as sodium stearate, potassium oleate, and semi-hardened tallow fatty acid sodium, alkyl sulfates such as sodium dodecyl sulfate, tri(2-hydroxyethyl)ammonium dodecyl sulfate, and sodium octadecyl sulfate, benzene sulfonates such as sodium nonylbenzene sulfonate, sodium dodecylbenzene sulfonate, sodium octadecylbenzene sulfonate, and sodium dodecyldiphenylether disulfonate, naphthalene sulfonates such as sodium dodecylnaphthalene sulfonate and a formalin naphthalene sulfonate condensate, sulfosuccinates such as didodecyl sodium sulfosuccinate and dioctadecyl sodium sulfosuccinate, polyoxyethylene sulfates such as sodium polyoxyethylene dodecylether sulfate, tri(2-hydroxyethyl)ammonium polyoxyethylene dodecyl ether sulfate, sodium polyoxyethylene octadecylether sulfate, and sodium polyoxyethylene dodecylphenylether sulfate, and phosphates such as potassium dodecyl phosphate and sodium octadecyl phosphate. However, the present invention is not limited to these examples.

Examples of the cationic surfactant of the ionic surfactant are alkyl amine salts such as octadecyl ammonium acetate and coconut oil amine acetate, and quaternary ammonium salts such as dodecyltrimethylammonium chloride, octadecyltrimethylammonium chloride, dioctadecyldimethylammonium chloride, and dodecylbenzyldimethylammonium chloride. However, the present invention is not limited to these examples.

Examples of the zwitterionic active agent of the ionic surfactant are alkylbetaines such as dodexylbetaine and octadecylbetaine, and amine oxides such as dodecyldimethylamine oxide, but the present invention is not limited to these examples.

Examples of the nonionic surfactant are polyoxyethylenealkylethers such as polyoxyethylenedodecylether, polyoxyethylenehexadecylether, polyoxyethyleneoctadecylether, and polyoxyethylene(9-octadecenyl)ether, polyoxyethylenephenylethers such as polyoxyethyleneoctylphenylether and polyoxyethylenenonylphenylether, oxirane polymers such as polyethylene oxide and copolyethylene oxide propylene oxide, sorbitan fatty acid esters such as sorbitan dodecanoate, sorbitan hexadecanoate, sorbitan octadecanoate, sorbitan(9-octadecenic acid)ester, sorbitan(9-octadecenoic acid) triester, polyoxyethylene sorbitan dodecanoate, polyoxyethylene sorbitan hexadecanoate, polyoxyethylene sorbitan octadecanoate, polyoxyethylene sorbitan octadecanoate triester, polyoxyethylene sorbitan(9-octadecenoic acid)ester, and polyoxyethylene sorbitan(9-octadecenoic acid)triester, sorbitol fatty acid esters such as polyoxyethylene sorbitol(9-octadecenoic acid)tetraester, and glycerin fatty acid esters such as glycerin octadecanoate and glycerin (9-octadecenoic acid)ester. However, the present invention is not limited to these examples.

Examples of the modified silicone oil are polyether modified silicone oil, methylstyrene modified silicone oil, olefin modified silicone oil, alcohol modified silicone oil, and alkyl modified silicone oil, but the present invention is not limited to these examples. Of these modified silicone oils, modified silicone oil to which various organic groups are added is more favorable because the oil shows high solubility to the active energy ray curing inkjet ink. An example of the modified silicone oil to which various organic groups are added is a radical such as (meth)acryl-terminated modified silicone oil or epoxy-terminated modified silicone oil, or cation reactive silicone oil.

The modified silicone oil is favorable because after a coating film of the active energy ray curing inkjet ink is formed on the substrate, the modified silicone oil does not excessively bleed to the surface of the coating film and hence hardly makes the surface sticky and hardly moves through the surface. Furthermore, silicone polyether acrylate and a polyether modified siloxane copolymer having active energy ray curability is favorable.

The active energy ray curing inkjet ink of this example embodiment may also contain an organic solvent as the surface tension adjusting agent of the component (C). However, the active energy ray curing inkjet ink contains a volatile component when using an organic solvent as the surface tension adjusting agent.

Note that the content of the surface tension adjusting agent of the component (C) is preferably 0.05 to 1.0 part by weight with respect to 100 parts by weight of the active energy ray curing inkjet ink.

Note also that the content of the leveling agent is preferably 0.05 to 3.0 parts by weight with respect to 100 parts by weight of the active energy ray curing inkjet ink.

[Other Components: Colorant etc.]

In addition, the active energy ray curing inkjet ink of this example embodiment may also contain a colorant as another component. Adjusting the addition amount of the colorant can make the active energy ray curing inkjet ink colored but transparent or colored and nontransparent. When the active energy ray curing inkjet ink contains the colorant, this active energy ray curing inkjet ink containing the colorant can be used as overcoat ink for coating base printing such as graphics, characters, and photographs printed on the substrate, and can also be used as ink for directly coating the substrate. Note that when the active energy ray curing inkjet ink of this example embodiment does not contain any colorant, the ink is colorless and transparent.

When the active energy ray curing inkjet ink containing the colorant is colored and transparent, the colors of base printing such as graphics, characters, and photographs printed on the substrate as a base and the color of the ink together improve the design of an image. When the ink is colored and nontransparent, three-dimensional colored characters or patterns can be obtained.

A dye or pigment can be used as the colorant. In particular, a pigment is used as the colorant in many cases from the viewpoint of the weather resistance. As the pigment, an organic pigment or inorganic pigment can be used. Examples of the inorganic pigment are carbon black (black), titanium oxide (white), and calcium carbonate (white), but the present invention is not limited to these examples.

Examples of the organic pigment are insoluble azo pigments such as toluidine red, toluidine maroon, hansa yellow, benzidine yellow, and pyrazolone red, soluble azo pigments such as lithol red, helio Bordeaux, pigment scarlet, and permanent red 2B, derivatives from Vat dyes such as alizarin, indanthrone, and thioindigo maroon, phthalocyanine-based organic pigments such as phthalocyanine blue and phthalocyanine green, quinacridone-based organic pigments such as quinacridone red and quinacridone magenta, perylene-based organic pigments such as perylene red and perylene scarlet, isoindolinone-based organic pigments such as isoindolinone yellow and isoindolinone orange, pyranthrone-based organic pigments such as pyranthrone red and pyranthrone orange, thioindigo-based organic pigments, condensed azo-based organic pigments, benzimidazolone-based organic pigments, quinophthalon-based organic pigments such as quinophthalon yellow, isoindoline-based organic pigments such as isoindoline yellow, and other pigments such as flavanthrone yellow, acylamide yellow, nickel azo yellow, copper azomethine yellow, perinone orange, anthrone orange, dianthraquinonyl red, and dioxazine violet. However, the present invention is not limited to these examples.

The active energy ray curing inkjet ink of this example embodiment may also contain various fillers or resin components as other components. When the active energy ray curing inkjet ink contains a filler or resin component, durability and designability can be given to a cured film formed by the ink.

Examples of the filler are extenders and resin beads such as calcium carbonate, barium sulfate, spherical silica, and hollow silica, but the present invention is not limited to these examples.

The resin component is not particularly limited as long as the resin is inactive to an active energy ray. Examples of the resin component are a polyurethane resin, a vinyl chloride-based resin (e.g., a polyvinyl chloride resin and vinyl chloride-vinyl acetate copolymer), an ethylene-vinyl acetate copolymer, a polyester resin, a poly(meth)acrylic resin, a polyketone resin, a polyvinyl-based resin (e.g., a polyvinylacetal resin, polyvinylbutyral resin, or polyvinylpyrrolidone resin), and a cellulose-based resin (e.g., a CAB resin or CAP resin). However, the present invention is not limited to these examples. The active energy ray curing inkjet ink of this example embodiment is manufactured by sufficiently dispersing (A) the active energy ray curing monomer and/or active energy ray curing oligomer, (B) the photopolymerization initiator, (C) the surface tension adjusting agent, and other components by using an ordinary disperser such as a bead mill.

When manufacturing the active energy ray curing inkjet ink containing the colorant, it is also possible to prepare a concentrate of the colorant in advance, and dilute the concentrate with the active energy ray curing monomer as the component (A). Since each component of the active energy ray curing inkjet ink does not change the properties during dispersion, active energy ray curing inkjet ink having high liquid stability can be manufactured. The manufactured active energy ray curing inkjet ink is preferably filtered by a filter having a size of 3.0 µm or less, and preferably, 1.0 µm or less.

When using the active energy ray curing inkjet ink of this example embodiment, the ink is supplied to an inkjet head of an inkjet printing apparatus. The active energy ray curing inkjet ink is ejected onto a substrate from the inkjet head, and irradiated with an active energy ray such as an ultraviolet ray or electron beam after that. Consequently, a coating film formed on the substrate by the active energy ray curing inkjet ink rapidly cures.

When radiating an ultraviolet ray, it is possible to use, e.g., a high-pressure mercury lamp, a metal halide lamp, a low-pressure mercury lamp, a super-high-pressure mercury lamp, an ultraviolet laser, and the sunlight as the light source of the active energy ray. When using an electron beam as the active energy ray, active energy ray curing inkjet ink can be prepared by mixing the materials except the abovementioned initiator and sensitizer.

The active energy ray curing inkjet ink of this example embodiment can be used as a set of a plurality of types, e.g., four, five, six, or seven types of inkjet inks containing different pigments. For example, when the number of types is four, examples are yellow (Y), magenta (M), cyan (C), and black (B), or yellow (Y), magenta (M), cyan (C), and white (W). However, the present invention is not limited to these examples.

<Inkjet Printing Apparatus>

An inkjet printing apparatus of this example embodiment will be explained below with reference to the accompanying drawings. Note that in the following explanation, the sheet-conveying-direction upstream side in the inkjet printing apparatus will simply be expressed as "the upstream side" in some cases, and the sheet-conveying-direction downstream side will simply be expressed as "the downstream side" in some cases, for the sake of convenience.

Figure 2:
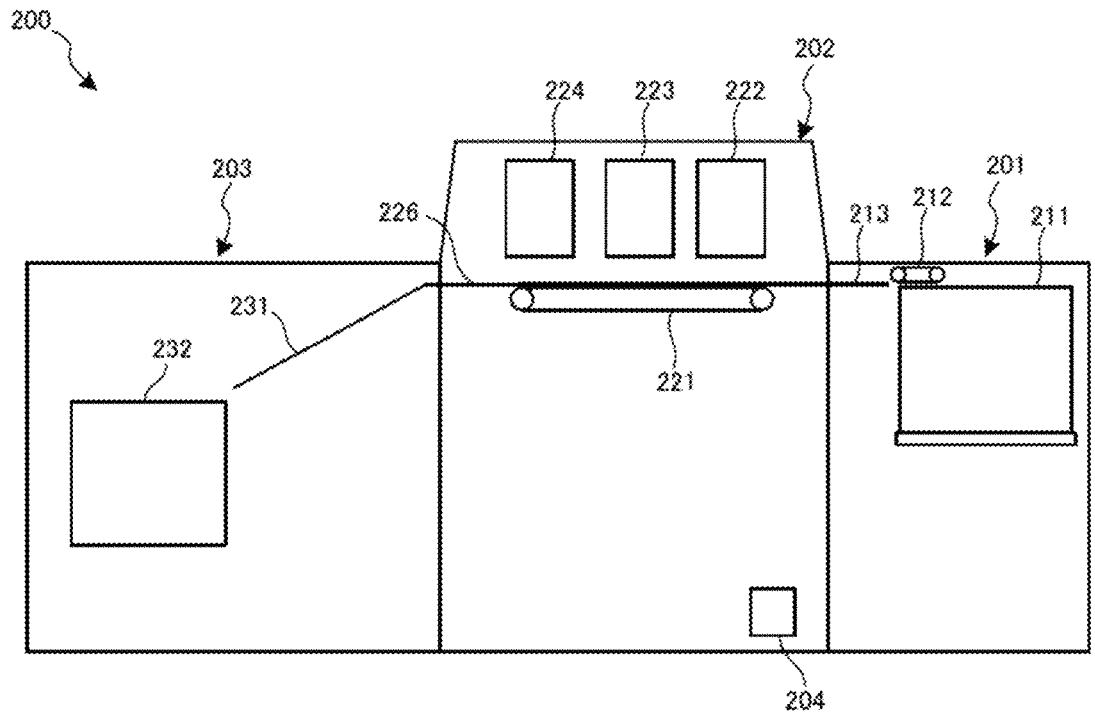
FIG. 2 is a view schematically showing an inkjet printing apparatus according to the example embodiment of the present invention.

FIG. 2 is a view schematically showing an inkjet printing apparatus 200 of this example embodiment. The inkjet printing apparatus 200 executes an overcoat printing process of forming an ink layer made of the active energy ray curing inkjet ink on a substrate on which an image is formed by base printing in advance, so as to overcoat the base printing. The inkjet printing apparatus 200 also executes a process of forming an ink layer made of the active energy ray curing inkjet ink on a substrate on which no image is formed by printing.

The inkjet printing apparatus 200 includes a conveyance element 201, an image printing device 202, and a stacker 203. The conveyance element 201 includes a substrate table 211 and a substrate supply mechanism 212. On the substrate table 211, image-formed substrates on which images are formed by base printing formed in advance by another inkjet printing apparatus (not shown) are stacked.

The substrate table 211 is vertically movable, and the substrate supply mechanism 212 supplies the uppermost one of the stacked substrates. Thus, the conveyance element 201 includes the substrate table 211 and substrate supply mechanism 212 and conveys substrates.

A substrate to be conveyed by the conveyance element 201 is not particularly limited as long as the substrate is a material on which an image can be printed. Examples are paper, a sheet such as surface-processed paper, a plastic plate, and a thin metal film.

The substrate supplied from the substrate supply mechanism 212 is conveyed along a conveyance path 213. The image printing device 202 is installed along a downstream-side portion of the conveyance path 213. The image printing device 202 includes a belt conveyor mechanism 221 for conveying the substrate conveyed along the conveyance path 213. The belt conveyor mechanism 221 conveys the substrate while sucking the substrate on the conveyance surface by an air suction force through holes formed in the belt. Above the belt conveyor mechanism 221, an image reader 222, an inkjet head unit 223, and an active energy source 224 are installed from the upstream side in the substrate conveying direction.

A discharge path 226 is connected to the downstream side of the image printing device 202. The substrate conveyed from the belt conveyor mechanism 221 is supplied to the discharge path 226. The substrate supplied to the discharge path 226 is unloaded to the stacker 203. The stacker 203 includes a conveyance path 231 and a substrate storage unit 232. The substrate unloaded from the discharge path 226 is discharged to and stored in the substrate storage unit 232 through the conveyance path 231. Note that in a modification, it is also possible to directly connect a printer, instead of the conveyance element 201, to the image printing device 202. In addition, a device for cutting and binding the supplied substrates may also be connected, instead of the stacker 203, to the image printing device 202.

The inkjet printing apparatus 200 further includes an electronic controller 204. The electronic controller 204 includes a CPU for executing various kinds of arithmetic processing, a ROM storing various control programs, and a RAM to be used as a work area for storing data and executing programs. The electronic controller 204 controls, e.g., the operations of actuators installed in the inkjet printing apparatus 200, thereby ejecting the active energy ray curing inkjet ink containing the components (A) to (C) below: (A) the active energy ray curing monomer and/or active energy ray curing oligomer; (B) the photopolymerization initiator; and (C) the surface tension adjusting agent and having a viscosity of 3.0 to 6.0 mPa·s at 35° C., onto the substrate from the inkjet head unit 223, and executing the overcoat printing process on base printing 102 formed on the substrate in advance.

Similarly, the electronic controller 204 ejects the active energy ray curing inkjet ink from the inkjet head unit 223 onto the substrate on which no image is formed by printing, thereby executing a process of forming an ink layer made of the ink.

The inkjet printing apparatus 200 includes an operation panel (not shown), and the user can perform various settings of the overcoat printing process by inputting operations via this operation panel. Note that in a modification, it is also possible to cause a display, mouse, and keyboard of an external PC to function as an operation panel, and cause the PC to function as the electronic controller 204.

Figure 3A:
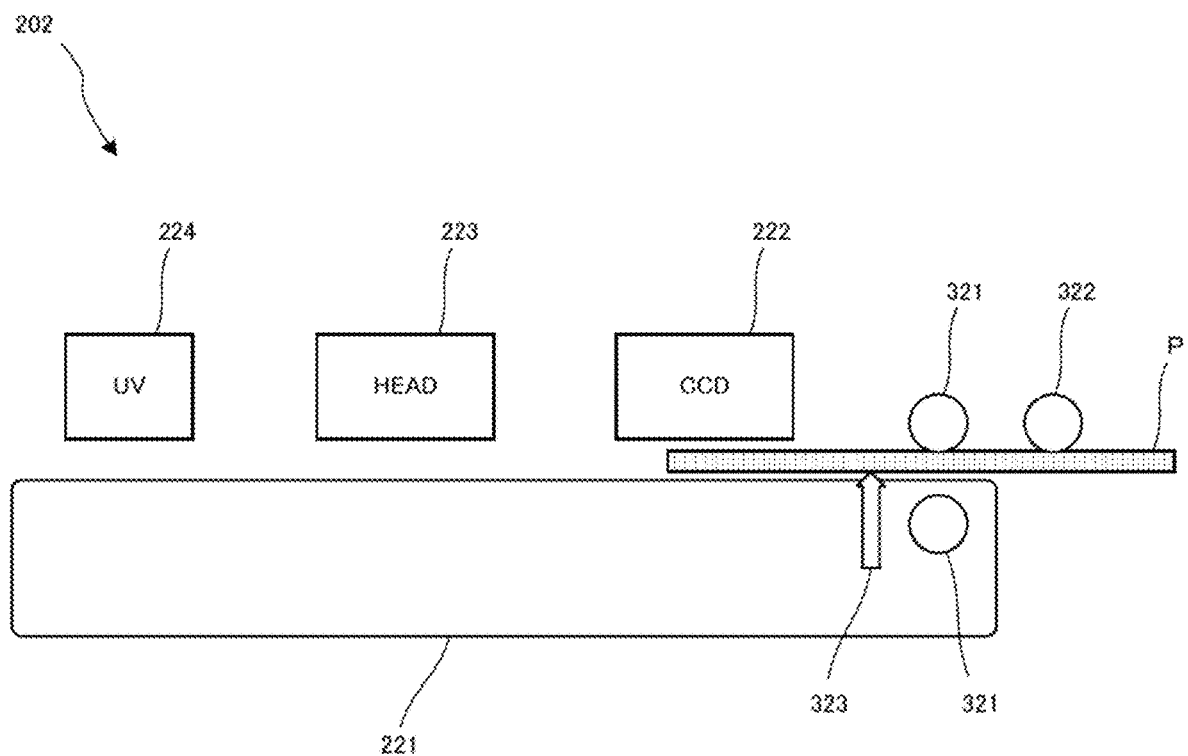
FIG. 3A is a view schematically showing details of main parts of the inkjet printing apparatus according to the example embodiment of the present invention.
Figure 3B:
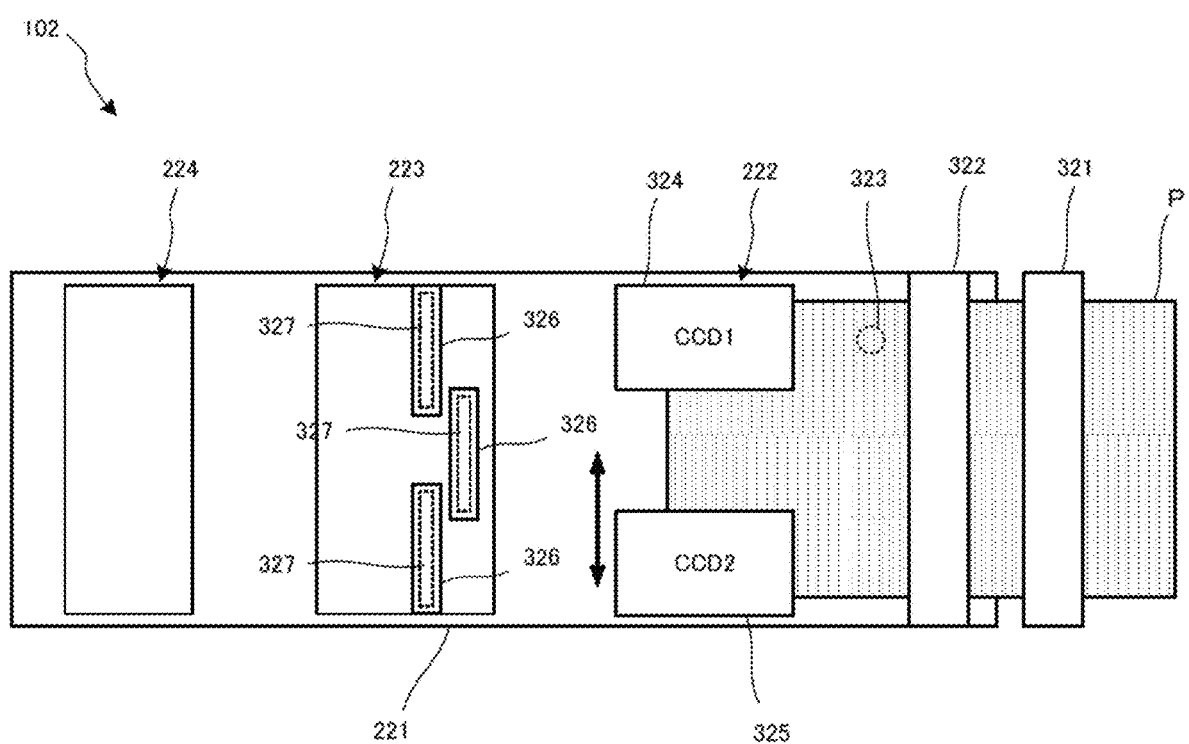
FIG. 3B is a view schematically showing the details of the main parts of the inkjet printing apparatus according to the example embodiment of the present invention.

FIGS. 3A and 3B are views schematically showing details of the image printing device 202 as a main part of the inkjet printing apparatus 200. FIG. 3A is a side view of the image printing device 202. FIG. 3B is a plan view of the image printing device 202. As shown in FIG. 3A, the image printing device 202 includes a plurality of conveyor rollers 321 for conveying a substrate P, as the belt conveyor mechanism 221. The substrate P is an image-formed substrate on which an image as an overcoat printing target formed by base printing and registration marks as references for specifying the image formation position of the base printing are printed.

For one driving roller of the plurality of conveyor rollers 321, which is arranged on the upstream side of the image reader 222, an encoder 322 (a rotary encoder) for calculating the conveyance amount of the substrate P from the rotational speed of the roller is installed. Also, an entering substrate sensor 323 for sensing the leading edge of the substrate P conveyed from the conveyance element 201 is installed between the image reader 222 and encoder 322.

The electronic controller 204 obtains an output pulse from the encoder 322 by using the sensing of the substrate P by the entering substrate sensor 323 as a trigger, and calculates the conveyance position of the substrate P. Then, based on the calculated position of the substrate P, the electronic controller 204 sets the timing of imaging by the image reader 222, the timing of ejection of the active energy ray curing inkjet ink by the inkjet head unit 223, and the timing of radiation of the active energy ray by the active energy source 224.

As shown in FIG. 3B, the image reader 222 includes a pair of image sensors 324 and 325 arranged apart from each other in the substrate widthwise direction above the belt conveyor mechanism 221. In the inkjet printing apparatus 200, the image sensors 324 and 325 are formed by CCD (Charge Coupled Device) sensors. In the inkjet printing apparatus 200, the image sensors 324 and 325 may also be formed by CMOS (Complementary Meta Oxide Semiconductor) sensors or other image sensors, instead of the CCDs.

The image sensor 324 is formed as a first sensor fixed on one side in the substrate widthwise direction. On the other hand, the image sensor 325 is formed as a second sensor arranged on the other side in the substrate widthwise direction so as to be movable in the substrate widthwise direction. That is, the distance between the pair of image sensors can be adjusted by driving the image sensor 325 in the substrate widthwise direction in accordance with the size of the substrate P. This printing apparatus can read the registration marks preprinted on the substrate at the same time as the base image by using the pair of image sensors 324 and 325, and thereby can recognize misregistration of the printing position of the base image on the read substrate from a theoretical position. If this misregistration can be recognized, the ejecting positions of the active energy ray curing inkjet ink of the example embodiment can be corrected in accordance with the misregistration, thereby correctly aligning the contents of the base formed on the substrate in advance and the coating image formed by the ink.

The inkjet head unit 223 includes three inkjet heads 326 for ejecting the active energy ray curing inkjet ink so as to overcoat the base printing formed on the substrate P in advance conveyed from the upstream side of the conveyance element 201. The three inkjet heads 326 function as so-called "printing heads". The active energy ray curing inkjet ink ejected from the inkjet heads 326 is active energy ray curing inkjet ink containing the components (A) to (C) below: (A) the active energy ray curing monomer and/or active energy ray curing oligomer; (B) the photopolymerization initiator; and (C) the surface tension adjusting agent, and having a viscosity of 3.0 to 6.0 mPa·s at 35° C. The active energy ray curing inkjet ink ejected from the inkjet heads 326 cures when the substrate is irradiated with the active energy ray from the active energy source 224. The active energy ray curing inkjet ink ejected from the inkjet heads 326 has the feature that the viscosity of the ink is 3.0 to 6.0 mPa·s at 35° C. which is a set temperature when the ink is ejected from the inkjet heads 326. The inkjet head unit 223 includes a temperature holding member 327 such as a heater for holding the temperature at 35° C. to 40° C. The location of this heater of the inkjet head unit 223 is not particularly limited as long as the temperature of the inkjet head unit 223 can be held at 35° C. to 40° C. Therefore, the heater can be installed either outside or inside the inkjet head unit 223. By holding the temperature at 35° C. to 40° C., the inkjet head unit 223 can control the temperature of the active energy ray curing inkjet ink to be ejected from the inkjet heads 326 at 35° C. However, depending on the shape and placement position of the heater, the temperature of the ink at the time of discharge can not be accurately controlled to 35° C., and it may be fluctuating around 1 to 3° C. In addition, the temperature of the ink sometimes fluctuates around 1 to 3° C. depending on the ambient temperature until landing on the substrate after ejection. Furthermore, depending on the temperature of the medium after landing, the temperature of the ink sometimes fluctuates around 1 to 3° C. In such these case, even the temperature of the ink fluctuates, since the viscosity of the ink of the present invention is low, the discharge stability and the self-leveling property are not deteriorated.

As shown in FIG. 3B, the inkjet head unit 223 is installed on the belt conveyor mechanism 221. The inkjet head unit 223 is arranged along a direction perpendicular to the conveyance direction of the substrate conveyed by the belt conveyor mechanism 221. In addition, the inkjet heads 326 are arranged to overlap each other so as not to form any gap between adjacent inkjet heads 326.

In a modification of the inkjet printing apparatus of this example embodiment, four or more inkjet heads 326 may also be arranged. In addition, in a modification of the inkjet printing apparatus, the inkjet heads 326 may also be a single inkjet head elongated in the substrate widthwise direction. Furthermore, ejection holes of the inkjet heads 326 may also be skewed at a predetermined angle to the substrate widthwise direction. That is, the ejection holes of the inkjet heads 326 may also be arranged in a predetermined direction which is not parallel to the substrate conveying direction. Also, as the inkjet head 326, it is possible to use an inkjet head which includes two or more lines and ejects the active energy ray curing inkjet ink from the two or more lines at the same time.

The active energy source 224 functions as "an active energy radiation unit". The active energy source 224 irradiates, with the active energy ray, the active energy ray curing inkjet ink formed on the substrate P conveyed by the conveyance element 201 from the upstream side, thereby curing the ink layer. That is, the active energy source 224 is a member for irradiating the substrate P coated with the active energy ray curing inkjet ink ejected from the inkjet head unit 223 with the active energy ray. The active energy source 224 is not particularly limited as long as the source can radiate the active energy ray such as an ultraviolet ray or electron beam. When using an ultraviolet ray as the active energy ray, it is possible to use, e.g., a high-pressure mercury lamp, a metal halide lamp, a low-pressure mercury lamp, a super-high-pressure mercury lamp, an ultraviolet laser, and the sunlight as the active energy source 224.

Figure 4:
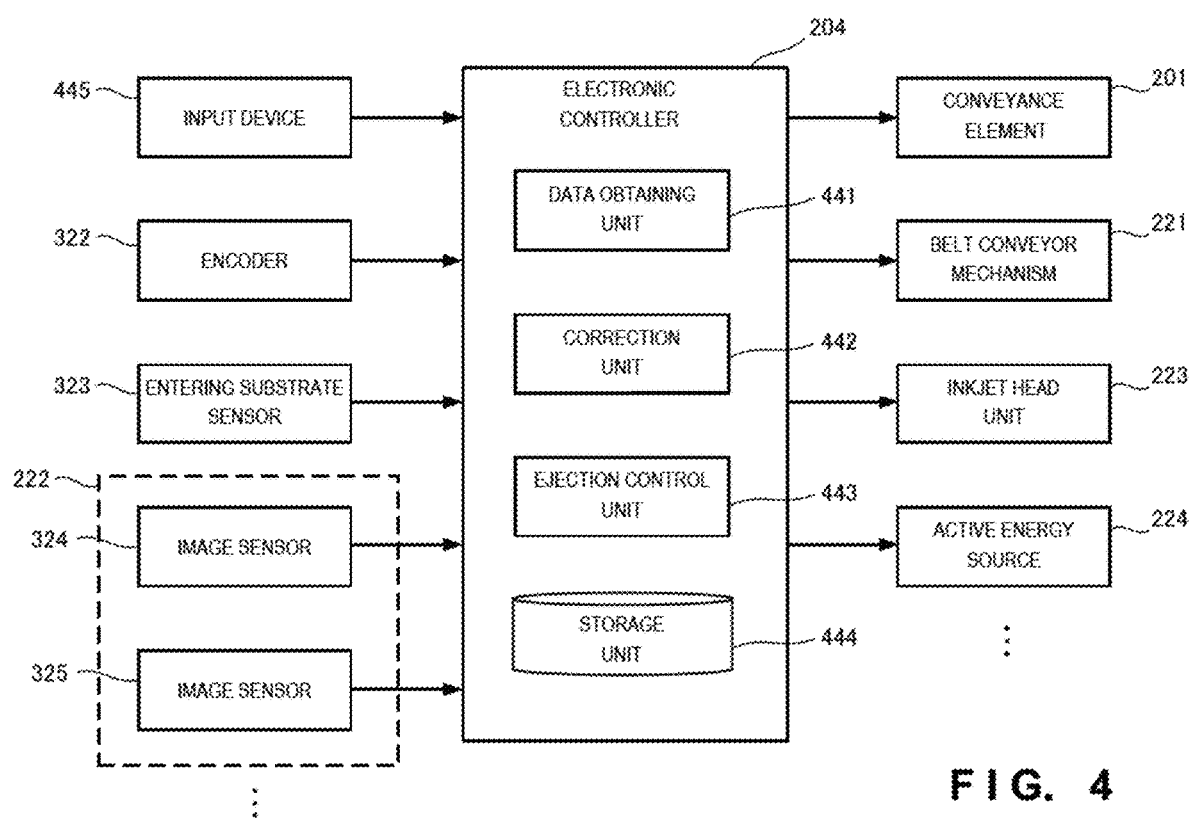
FIG. 4 is a schematic view mainly showing an electrical configuration including an electronic controller of the inkjet printing apparatus according to the example embodiment of the present invention.

FIG. 4 is a schematic view showing an electrical configuration including the electronic controller 204 of the inkjet printing apparatus 200. FIG. 4 shows the electronic controller 204 by functional blocks. These functions are implemented by cooperation of hardware such as a CPU for executing various kinds of arithmetic processing, a ROM storing various control programs, and a RAM to be used as a work area for storing data and executing programs, and software. Accordingly, these functional blocks can be implemented in various forms by combining hardware and software.

The electronic controller 204 includes a data obtaining unit 441, a correction unit 442, an ejection control unit 443, and a storage unit 444. The electronic controller 204 receives signals from an input device 445 installed on the operation panel (not shown). The input device 445 includes various switches such as a start switch for starting the overcoat printing process, and a stop switch for stopping the overcoat printing process. The electronic controller 204 also receives sensing signals from, e.g., the encoder 322, entering substrate sensor 323, and image sensors 324 and 325 already explained above. Based on these switch/sensor inputs, the electronic controller 204 executes predetermined arithmetic processing for, e.g., supplied substrate control, conveyance control, active energy ray curing inkjet ink ejection control, active energy ray radiation control, and outputs control command signals to, e.g., the conveyance element 201, belt conveyor mechanism 221, inkjet head unit 223, and active energy source 224.

The storage unit 444 of the electronic controller 204 stores the contents of base printing formed on the substrate in advance. The inkjet printing apparatus of this example embodiment obtains image data representing the contents of the base printing from the outside. This inkjet printing apparatus downloads the image data representing the contents of the base printing from the outside such as a communication line, and stores the data in the storage unit 444.

In addition, the storage unit 444 stores ejection data for specifying an ejection pattern of the active energy ray curing inkjet ink to be ejected from the inkjet head unit 223. This ejection pattern includes ejection data containing contents (to be called "overprinting" hereinafter) to be printed by being ejected on the formed base printing in advance.

The storage unit 444 contains information of the printing positions, on the substrate P, of a plurality of registration marks formed on the substrate P in advance at the same time as base printing and the shapes of these marks. Printing misalignment of the base image on the substrate P is detected by comparing the read positions and read shapes of the registration marks, which are obtained by reading the substrate P by the image sensors, with the printing positions and shapes stored in the storage unit 444.

Note that the data obtaining unit 441 is a member for obtaining this ejection data. The data obtaining unit 441 can obtain the data by being connected to an external terminal such as a personal computer (not shown), and a storage device such as a USB memory (not shown).

The electronic controller 204 includes the ejection control unit 443 for controlling the ejection amount of the active energy ray curing inkjet ink to be ejected from the inkjet heads 326. The ejection control unit 443 refers to the ejection data stored in the storage unit 444, and controls the ejection amount of the active energy ray curing inkjet ink so as to overcoat the substrate P having undergone base printing with the ink.

The electronic controller 204 includes the correction unit 442. The correction unit 442 reads out the ejection data from the storage unit 444, and corrects the ejection data based on the registration mark position information (designed positions) contained in the ejection data, and actual registration mark position information (measured positions) read by the image reader 222.

If the position of the registration mark of the base image printed on the substrate P, i.e., the base printing printed on the substrate P is deviated from the designed value, it is impossible to accurately perform the overcoat printing process by overcoating of the active energy ray curing inkjet ink along the actual base printing by ejection control of the ejection control unit 443 based on the ejection data stored in the storage unit 444.

Likewise, if the substrate P conveyed from the upstream side by the conveyance element 201 is skewed, it is impossible to accurately perform the overcoat printing process by overcoating of the active energy ray curing inkjet ink along the actual base printing.

Accordingly, the correction unit 442 calculates the difference between the designed value of the base printing and the measured value of the base printing based on the positional change of the registration mark. In addition, the correction unit 442 executes a correction process for compensating for the difference on the ejection data. Thus, the ejection control unit 443 can control the ejection amount of the active energy ray curing inkjet ink of the inkjet head unit 223 based on the corrected ejection data by using the correction unit 442.

<Inkjet Ink Cleaning Solution>

The following inkjet ink cleaning solution can be used in the inkjet printing apparatus of this example embodiment. The inkjet head of the inkjet printing apparatus ejects the active energy ray curing inkjet ink toward the substrate. After the overcoat printing process is complete, the active energy ray curing inkjet ink not ejected to the substrate remains in the inkjet head. This active energy ray curing inkjet ink remaining in the inkjet head causes inconveniences such as clogging of the inkjet head, a reduction of the ink ejection amount, and a failure. An inkjet ink cleaning solution for cleaning the inkjet head is necessary to avoid these inconveniences of the inkjet head. By applying the inkjet ink cleaning solution to the inkjet head, the remaining active energy ray curing inkjet ink is removed. As a consequence, no remaining active energy ray curing inkjet ink exists in the inkjet head. That is, the inkjet ink cleaning solution can always maintain the inkjet head in a favorable state, thereby maintaining the performance of the inkjet printing apparatus.

The inkjet cleaning solution contains a solvent and a polymerization inhibitor. An ether-based solvent can be used as the solvent for use in the inkjet cleaning solution. Practical examples of the ether-based solvent are diethyleneglycol monomethylether, triethyleneglycol monomethylether, polyethyleneglycol monomethylether, ethyleneglycol isopropylether, diethyleneglycol monoisopropylether, ethyleneglycol monobutylether, diethyleneglycol monobutylether, triethyleneglycol monobutylether, polyethyleneglycol monobutylether, ethyleneglycol monoisobutylether, diethyleneglycol monoisobutylether, ethyleneglycol monohexylether, diethyleneglycol monohexylether, ethyleneglycol mono 2-ethylhexylether, ethyleneglycol monoallylether, polyoxyethylene monoallylether, ethyleneglycol monophenylether, diethyleneglycol monophenylether, polyoxyalkylene monophenylether, ethyleneglycol monobenzylether, diethyleneglycol monobenzylether, dipropyleneglycol monomethylether, tripropyleneglycol monomethylether, propyleneglycol monopropylether, dipropyleneglycol monopropylether, propyleneglycol mono n-butylether, dipropyleneglycol mono n-butylether, propyleneglycol monophenylether, propyleneglycol monoethylether, triethyleneglycol dimethylether, tetraethyleneglycol dimethylether, diethyleneglycol methylethylether, diethyleneglycol diethylether, dipropyleneglycol dimethylether, diethyleneglycol monoethylether acetate, diethyleneglycol monobutylether acetate, propyleneglycol monomethylether acetate, dipropyleneglycol monomethylether acetate, diethyleneglycol di40acetate, propyleneglycol diacetate, dipropyleneglycol diacetate, ethyleneglycol acetate propionate, and ethyleneglycol acetate butylate. However, the present invention is not limited to these examples.

The boiling point of the solvent contained in the inkjet cleaning solution is preferably 200° C. or more because the cleaning solution must be dried after cleaning of the inkjet head. The viscosity of the solvent contained in the inkjet cleaning solution is preferably 9 mPa·s or less, more preferably 1.5 to 9 mPa·s, and most preferably 2.0 to 8 mPa·s, at 25° C. As the solvent contained in the inkjet cleaning solution, the abovementioned solvents can be used singly, or two or more types of the solvents can be mixed.

Examples of the polymerization inhibitor contained in the inkjet cleaning solution are phenol compounds such as p-methoxy phenol, cresol, t-butyl catechol, di-t-butyl paracresol, hydroquinone monomethylether, α-naphthol, 3,5-di-t-butyl-4-hydroxytoluene, 2,2'-methylene bis(4-methyl-6-t-butylphenol), 2,2'-methylene bis(4-ethyl-6-butylphenol), and 4,4'-thio bis(3-methyl-6-t-butylphenol), quinone compounds such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-di-butyl-hydroquinone, mono-t-butylhydroquinone, monomethylhydroquinone, and 2,5-di-t-amylhydroquinone, amine compounds such as phenyl-β-naphthylamine, p-benzylaminophenol, di-β-naphthylparaphenylenediamine, dibenzylhydroxylamine, phenylhydroxylamine, phenothiazine, and diethylhydroxylamine, nitro compounds such as dinitrobenzene, trinitrotoluene, and picric acid, oxime compounds such as quinone dioxime and cyclohexanone oxime, and sulfur compounds such as phenothiazine. However, the present invention is not limited to these examples.

As the polymerization inhibitor contained in the inkjet cleaning solution, the abovementioned polymerization inhibitors can be used singly, or two or more types of the polymerization inhibitors can be mixed. The mixing amount of the polymerization inhibitor contained in the inkjet cleaning solution is preferably 0.1 to 7.0 wt % or less, more preferably 0.5 to 5.0 wt %, and most preferably 1.0 to 3.0 wt % with respect to the weight of the inkjet cleaning solution. The mixing amount of the polymerization inhibitor is preferably 0.1 wt % or more because the polymerization reaction of the residual active energy ray curing inkjet ink can be suppressed. Also, the mixing amount of the polymerization inhibitor is preferably 7.0 wt % or less because the cost of the inkjet cleaning solution can be reduced.

<Inkjet Printing Method>

An inkjet printing method of this example embodiment will be explained below. This inkjet printing method is implemented by using the active energy ray curing inkjet ink and inkjet printing apparatus of this example embodiment.

That is, the inkjet printing method of this example embodiment is characterized by including conveying a substrate by a conveyance element, ejecting active energy ray curing inkjet ink toward the substrate conveyed by the conveyance element by using an inkjet head including nozzles facing the substrate, the active energy ray curing inkjet ink containing components (A) to (C) below: (A) an active energy ray curing monomer and/or an active energy ray curing oligomer; (B) a photopolymerization initiator; and (C) a surface tension adjusting agent, and having a viscosity of 3.0 to 6.0 mPa·s at 35° C., coating the substrate with the active energy ray curing inkjet ink, and curing the active energy ray curing inkjet ink by irradiating the substrate coated with the active energy ray curing inkjet ink with an active energy ray.

(Step of Conveying Substrate by Conveyance Element)

The inkjet printing method of this example embodiment includes the step of conveying the substrate by the conveyance element. The conveyance element of the inkjet printing apparatus conveys the substrate as a target of the overcoat printing process by using the substrate table, substrate supply mechanism, and the like.

(Step of Ejecting Active Energy Ray Curing Inkjet Ink toward Substrate)

Then, the inkjet printing method of this example embodiment includes the step of ejecting the active energy ray curing inkjet ink toward the substrate. The substrate conveyed by the substrate supply mechanism in the substrate conveying step explained above is conveyed along the conveyance path.

Furthermore, the substrate conveyed along the conveyance path is conveyed to the image printing device installed along the downstream-side portion of the conveyance path. The substrate conveyed to the image printing device reaches the inkjet head unit. The inkjet heads eject, toward the substrate, the active energy ray curing inkjet ink which contains the components (A) to (C) below: (A) the active energy ray curing monomer and/or active energy ray curing oligomer; (B) the photopolymerization initiator; and (C) the surface tension adjusting agent, and has a viscosity of 3.0 to 6.0 mPa·s at 35° C. The inkjet heads eject the active energy ray curing inkjet ink such that the ink overlaps the base printing formed on the substrate in advance conveyed from the upstream side of the conveyance element.

(Step of Coating Substrate with Active Energy Ray Curing Inkjet Ink)

The inkjet printing method of this example embodiment also includes the step of coating the substrate with the active energy ray curing inkjet ink. The active energy ray curing inkjet ink ejected toward the substrate from the inkjet heads lands on the substrate. The ink having landed on the substrate has a viscosity of 3.0 to 6.0 mPa·s at 35° C., and hence has self-leveling properties on the substrate. Therefore, the active energy ray curing inkjet ink forms a uniform coating film made of the ink on the substrate.

(Step of Curing Active Energy Ray Curing Inkjet Ink)

Finally, the inkjet printing method of this example embodiment includes the step of curing the active energy ray curing inkjet ink. The coating film formed on the substrate receives the active energy ray such as an ultraviolet ray radiated from the active energy source.

Upon receiving the active energy, the active energy ray curing monomer as the component (A) forming the coating film formed on the substrate starts a polymerization reaction by a catalyst active species generated from the photopolymerization initiator as the component (B). The coating film formed on the substrate cures because the active energy ray curing monomer as the component (A) causes the polymerization reaction. Thus, the inkjet printing method including the abovementioned steps can form an image made of the active energy ray curing inkjet ink so that the image overlaps the base printing formed on the substrate in advance. The inkjet printing method of this example embodiment can provide a high-quality image having neither image missing nor image blur because the method uses the abovementioned active energy ray curing inkjet ink.

EXAMPLES

The present invention will be explained in more detail below by way of its examples, but the present invention is not limited to these examples.

Example 1

(Manufacture of Active Energy Ray Curing Inkjet Ink)

Active energy ray curing inkjet ink containing components (A) to (C) below was manufactured.

Component (A): Four monomers (A1) to (A4) below were selected as active energy ray curing monomers and mixed such that the amount of the whole active energy ray curing monomer was 100 parts by weight, thereby obtaining the active energy ray curing monomer of the component (A). Also, an active energy ray curing oligomer was added to the active energy ray curing monomer of the component (A). (A1): 20 parts by weight of 2-(2-vinyloxyethoxy)ethyl acrylate (VEEA [trade name], manufactured by NIPPON SHOKUBAI, viscosity=3.65 mPa·s (25° C.), abbreviated as "VEEA"), (A2): 40 parts by weight of butanediol diacrylate (FA-124AS [trade name], manufactured by Hitachi Chemical, viscosity=5 mPa·s (25° C.), abbreviated as "FA124"), (A3): 25 parts by weight of tetrahydrofulfuryl acrylate (V#150 [trade name], manufactured by OSAKA ORGANIC CHEMICAL, viscosity=2.8 mPa·s (25° C.), abbreviated as "V150"), and (A4): 15 parts by weight of 2-methyl-2-ethyl-1,3-dioxolan-4-yl)methyl acrylate (MEDOL-10 [trade name], manufactured by OSAKA ORGANIC CHEMICAL, viscosity=5.1 mPa·s (25° C.), abbreviated as "MEDOL").

Furthermore, the active energy ray curing oligomer was added to the component (A) described above. (The active energy ray curing oligomer) component: 10 parts by weight of amine modified polyether acrylate (EBECRYL80 [trade name], manufactured by DAICEL-ALLNEX, viscosity=3,000 mPa·s (25° C.), abbreviated as "EBE80") were added.

Component (B): Two photopolymerization initiators (B1) and (B2) below were selected as the photopolymerization initiators. These photopolymerization initiators were mixed such that the amount of the whole photopolymerization initiator was 8 parts by weight, thereby obtaining the photopolymerization initiator of the component (B). (B1): 6 parts by weight of bis(2,4,6-trimethylbenzoyl)-phenylphosphine oxide (IRGACURE 819 [trade name], manufactured by BASF, abbreviated as "819"), (B2): 2 parts by weight of 2,4,6-trimethylbenzoyl-diphenyl-phosphine oxide (DAROCURE TPO [trade name], manufactured by BASF, abbreviated as "TPO").

Component (C): A surface tension adjusting agent below was selected as the surface tension adjusting agent. 0.01 part by weight of polydimethylsiloxane having a polyether modified acryl group (BYK-UV3500 [trade name], manufactured by BYK, abbreviated as "UV3500").

The abovementioned components were mixed, and the mixture was completely dissolved by being stirred at 40° C. for two hours. After that, a solution containing the obtained active energy ray curing inkjet ink was filtered by using a 1.0-μm membrane filter, thereby obtaining the active energy ray curing inkjet ink of this example embodiment.

Note that the content (wt %) of the active energy ray curing monomer having a viscosity of 8 mPa·s or less in the active energy ray curing inkjet ink obtained in Example 1 was calculated based on the mixing ratios of the above components, and found to be 84.7%.

(Viscosity and Surface Tension of Active Energy Ray Curing Inkjet Ink)

The viscosity and surface tension of the active energy ray curing inkjet ink obtained in Example 1 were measured. More specifically, the viscosity of the active energy ray curing inkjet ink manufactured in Example 1 was measured according to the rule at 25° C. and 35° C. by using a viscometer: RE-85L available from TOKI SANGYO. Also, the surface tension of the active energy ray curing inkjet ink obtained in Example 1 was measured according to the rule at 25° C. by using a surface tensiometer: SITA t60 available from EKO Instruments.

The viscosity of the active energy ray curing inkjet ink of Example 1 was measured at 35° C. and found to be 4.0 mPa·s.

Table 1 shows the composition and the physical properties of the viscosity and surface tension of the active energy ray curing inkjet ink obtained in Example 1.

TABLE 1

| Composition and Viscosity of Active Energy Ray Curing Inkjet Ink | | | | | | | | | |
|---|---|---|---|---|---|---|---|---|---|
| | Curable monomer (part by weight) | | | | | | | Curable oligomer polymer (part by weight) | |
| | APG100 | APG200 | VEEA | FA124 | SR217 | IBXA | V150 | MEDOL | EBE80 | DAPK |
| Example 1 | ... | ... | 20 | 40 | ... | ... | 25 | 15 | 10 | ... |
| Example 2 | ... | ... | 20 | 40 | ... | ... | 25 | 15 | 10 | ... |
| Example 3 | ... | ... | 20 | 40 | ... | ... | 25 | 15 | 10 | ... |
| Example 4 | 30 | ... | ... | 30 | ... | ... | 25 | 15 | ... | 5 |
| Example 5 | ... | ... | 20 | 40 | ... | 20 | 5 | 10 | 10 | ... |
| Example 6 | ... | ... | 60 | ... | ... | ... | 35 | 5 | ... | 5 |

TABLE 1-continued

Composition and Viscosity of Active Energy Ray Curing Inkjet Ink

| | | | | | | | | | |
|---|---|---|---|---|---|---|---|---|---|
| Example 7 | ... | ... | 40 | ... | 43 | ... | 17 | ... | ... | 5 |
| Example 8 | ... | ... | 42 | 20 | 30 | ... | 10 | ... | ... | 5 |
| Comparative Example 1 | ... | ... | 20 | ... | ... | ... | 80 | ... | ... | 5 |
| Comparative Example 2 | ... | 20 | ... | 40 | ... | ... | 25 | 15 | 10 | ... |
| Comparative Example 3 | ... | 30 | 20 | ... | 14 | ... | 38 | ... | 10 | ... |

| | Photopolymerization initiator (part by weight) | | Surface tension adjusting agent (part by weight) | Viscosity (mPa · s) | | Content (%) of curable monomer of 8 mPa · s or less in |
|---|---|---|---|---|---|---|
| | 819 | TPO | UV3500 | 35° C. | 25° C. | Ink |
| Example 1 | 6 | 2 | 0.01 | 4 | 5.9 | 84.7 |
| Example 2 | 6 | 2 | 1 | 4.2 | 6.1 | 84 |
| Example 3 | 6 | 2 | 3 | 4.5 | 6.5 | 82.6 |
| Example 4 | 6 | 2 | 1 | 5.7 | 8.7 | 87.7 |
| Example 5 | 6 | 2 | 3 | 5.9 | 8.9 | 86.2 |
| Example 6 | 6 | 2 | 0.01 | 3.1 | 4.7 | 88.5 |
| Example 7 | 6 | 2 | 0.01 | 6 | 8.9 | 50.4 |
| Example 8 | 6 | 2 | 0.01 | 5.5 | 8.6 | 61.9 |
| Comparative Example 1 | 6 | 2 | 0.01 | 2.9 | 4.4 | 88.5 |
| Comparative Example 2 | 6 | 2 | 0.01 | 6.2 | 9.1 | 70.8 |
| Comparative Example 3 | 6 | 2 | 0.01 | 7.1 | 9.8 | 49.6 |

(Printing on Substrate by Active Energy Ray Curing Inkjet Ink)

The active energy ray curing inkjet ink obtained in Example 1 was set in an inkjet head, and printing was performed on substrates by using the inkjet printing apparatus of this example embodiment. The inkjet printing apparatus was a line-type piezo inkjet printer having an inkjet head heating function and UV radiating function.

As the substrates, printing products A and B printed in black were used. The printing products A and B were manufactured under different conditions. More specifically, the printing product A was a laminate-film printing product having undergone UV offset or corona processing. The printing product B was a POD printed product using dry toner as a colorant.

Printing on the substrates was performed by coating each substrate with the active energy ray curing inkjet ink such that the thickness of the coating film was 30 μm, and curing the ink coating film by UV irradiation. Printing on the substrates was continuously performed on 100 printing products A and 100 printing products B as the substrates printed in black.

(Evaluation of Active Energy Ray Curing Inkjet Ink)

The active energy ray curing inkjet ink obtained in Example 1 was evaluated by observing the printed products obtained by using the active energy ray curing inkjet ink. The evaluation of the active energy ray curing inkjet ink was performed from both (a) image missing and (b) image blur of the printed products. In addition, (c) total evaluation of the active energy ray curing inkjet ink was performed by including the stability of ejection from the inkjet printing apparatus.

(a) Image Missing

The evaluation of image missing was performed by the following criteria.

◯: Image dot missing and image line missing were not found at all and a uniform ink coating film was formed over the entire surface of the printed product. Δ: In a 50 mm×50 mm solid portion of the printed product, one to ten image dots were missing, or one or two image lines were missing. X: In a 50 mm×50 mm solid portion, ten or more image dots were missing, or three or more image lines were missing.

(b) Image Blur

The evaluation of image blur was performed by the following criteria. Four-point (1.41-mm) lines (coating film thickness=30 μm) were printed on the printing products A and B, and the ratio of thickening of each line after printing was evaluated.

◯: Thickening of the line was 10% or less. Δ1: Thickening of the line was 10% or more and less than 20%. Δ2: The line was slightly cut. X1: Thickening of the line was 20% or more. X2: Dots continued, and no line was formed.

(c) Total Evaluation

◯: The ejection stability of the active energy ray curing inkjet ink was high, and the printing product was satisfactory in quality of the printed product. X: The ejection stability of the active energy ray curing inkjet ink was not high, and the printing product was unsatisfactory in quality of the printed product.

Table 2 shows the results of evaluation 1 (image missing) and evaluation 2 (blur) of the active energy ray curing inkjet ink obtained in Example 1.

TABLE 2

Physical Properties and Evaluation of Active Energy Ray Curing Inkjet Ink

| | Physical properties | | Evaluation 1 (image missing) | | Evaluation 2 (blur) | | Inkjet head | Printed |
|---|---|---|---|---|---|---|---|---|
| | Viscosity | Surface tension | | | | | | |
| | (35° C.) (mPa·s) | (25° C.) (mN/m) | Printing product A | Printing product B | Printing product A | Printing product B | ejection stability | product total evaluation |
| Example 1 | 4 | 30.2 | ○ | x | ○ | Δ2 | Very good | ○ |
| Example 2 | 4.2 | 21.9 | ○ | ○ | Δ1 | ○ | Very good | ○ |
| Example 3 | 4.5 | 21 | ○ | ○ | Δ1 | ○ | Very good | ○ |
| Example 4 | 5.7 | 22.2 | ○ | ○ | Δ1 | ○ | Very good | ○ |
| Example 5 | 5.9 | 21.1 | ○ | ○ | Δ1 | ○ | Very good | ○ |
| Example 6 | 3.1 | 30.8 | ○ | x | ○ | ○ | Very good | ○ |
| Example 7 | 6 | 30.5 | ○ | x | ○ | Δ2 | Very good | ○ |
| Example 8 | 5.5 | 30.8 | ○ | x | ○ | Δ2 | Very good | ○ |
| Comparative Example 1 | 2.9 | 30.1 | ○ | x | ○ | Δ2 | Bad | x |
| Comparative Example 2 | 6.2 | 31.1 | Δ | x | ○ | x2 | Good | x |
| Comparative Example 3 | 7.1 | 31.2 | x | x | ○ | x2 | Good | x |

Examples 2-8

Active energy ray curing inkjet inks of Examples 2 to 8 were manufactured following the same procedures as in Example 1, except that the types and mixing ratios of the components (A) to (C) contained in the active energy ray curing inkjet ink manufactured in Example 1 were changed. Also, the viscosity and surface tension of each of the active energy ray curing inkjet inks obtained in Examples 2 to 8 were measured in the same manner as in Example 1.

Active energy ray curing monomers used anew in Examples 2 to 8 are as follows. Component (A): dipropyleneglycol diacrylate (APG-100 [trade name], manufactured by Shin-Nakamura Chemical, viscosity=8 mPa·s (25° C.), abbreviated as "APG100"), butylcyclohexanol acrylate (SR217 NS [trade name], manufactured by SARTOMER, viscosity=9 mPa·s (25° C.), abbreviated as "SR217"), isobornyl acrylate (IBXA [trade name], manufactured by OSAKA ORGANIC CHEMICAL, viscosity=7.7 mPa·s (25° C.), abbreviated as "IBXA"). In Examples 4 and 6 to 8, the following polymer component was mixed.

(Polymer Component) a diallylphthalate prepolymer (DAP K [trade name], manufactured by DAISO, abbreviated as "DAP K").

Table 1 shows the compositions and the physical properties of the viscosity and surface tension of the active energy ray curing inkjet inks obtained in Examples 2 to 8. Note that in Examples 2 to 8, the viscosity of each obtained active energy ray curing inkjet ink was 4.2 to 6.0 mPa·s at 35° C.

Comparative Examples 1-3

Active energy ray curing inkjet inks of Comparative Examples 1 to 3 were manufactured following the same procedures as in Example 1, except that the types and mixing ratios of the components (A) to (C) contained in the active energy ray curing inkjet ink manufactured in Example 1 were changed. Also, the viscosity and surface tension of each of the active energy ray curing inkjet inks obtained in Comparative Examples 1 to 3 were measured in the same manner as in Example 1.

An active energy ray curing monomer used anew in Comparative Examples 1 to 3 is as follows.

Component (A): tridipropyleneglycol diacrylate (APG-200 [trade name], manufactured by Shin-Nakamura Chemical, viscosity=12 mPa·s (25° C.), abbreviated as "APG200").

Table 1 shows the compositions and the physical properties of the viscosity and surface tension of the active energy ray curing inkjet inks obtained in Comparative Examples 1 to 3. Note that the viscosity of each of the active energy ray curing inkjet inks obtained in Comparative Examples 1 to 3 did not fall within the range of 3.0 to 6.0 mPa·s at 35° C. More specifically, the viscosities were Comparative Example 1 (2.9 mPa·s), Comparative Example 2 (6.2 mPa·s), and Comparative Example 3 (7.1 mPa·s).

Table 1 reveals that the viscosity of each of the active energy ray curing inkjet inks obtained in Examples 1 to 8 fell within the range of 3.0 to 6.0 mPa·s at 35° C. On the other hand, Table 1 shows that the viscosity of each of the active energy ray curing inkjet inks obtained in Comparative Examples 1 to 3 did not fall within the range of 3.0 to 6.0 mPa·s at 35° C.

Furthermore, Table 2 reveals that when the viscosity of the active energy ray curing inkjet ink is 6.0 mPa·s or less at 35° C., the ink has good self-leveling properties and can form a uniform coating film.

That is, it is found that when an image is formed by using active energy ray curing inkjet ink having a viscosity of 6.0 mPa·s or less at 35° C., a good image having neither image line missing nor image blur can be obtained.

It is also found that when the viscosity of the active energy ray curing inkjet ink is 3.0 mPa·s or more at 35° C., the ejection stability is very high when ejecting the ink by using the inkjet printing apparatus.

It is found that a good image having neither image line missing nor image blur can be obtained by taking account of the relationship between the surface tension [X] mN/m of various printing products and the surface tension [Y] of the active energy ray curing inkjet ink, and adjusting the value of [X] mN/m -[Y] mN/m as the difference between them within a predetermined range. That is, it is found that a very good image having neither image missing nor image blur can be obtained by adjusting the surface tension of the active energy ray curing inkjet ink within a minimum appropriate range in accordance with the type of printing product.

Figure 5:
FIG. 5 is a view showing an example of the printed product manufactured by using the active energy ray curing inkjet ink according to the example embodiment of the present invention.
Figure 6:
FIG. 6 is an enlarged view showing the example of the printed product manufactured by using the active energy ray curing inkjet ink according to the example embodiment of the present invention.

FIG. 5 is a view showing an example of a printed product formed by using the active energy ray curing inkjet ink obtained in Example 1. FIG. 6 is an enlarged view of a part of FIG. 5. FIG. 5 shows the printed product formed by using the active energy ray curing inkjet ink obtained in Example 1. FIG. 6 shows an enlarged printed product formed by using the active energy ray curing inkjet ink obtained in Example 1.

As shown in FIG. 5, it is clearly understood that the printed product formed by using the active energy ray curing inkjet ink of this example embodiment is a good image having neither image line missing nor image blur, and is an extremely high-quality image.

Furthermore, as shown in FIG. 6, the printed product formed by using the active energy ray curing inkjet ink of this example embodiment has no "blur" in relation to a base-printed substrate. In addition, this printed product has a three-dimensional shape rising in the vertical direction while maintaining almost the same shapes as those of characters and figures of the base printing.

The boundary between a substrate not coated with the active energy ray curing inkjet ink and a substrate on which the base printing such as characters and figures is coated with the active energy ray curing inkjet ink is clearly formed along the base printing such as the characters and figures.

The contour of an image of the base printing such as the characters and figures forming the printed product shown in FIG. 6 is sharp.

The printed product shown in FIG. 6 is a substrate overcoated with the active energy ray curing inkjet ink of this example embodiment. Therefore, this printed product has a shape three-dimensionally rising from the substrate and achieves an extremely good design together with the color of the substrate itself or of the image of the base printing.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

What is claimed is:

1. An active energy ray curing inkjet ink containing components (A) to (C) below: (A) an active energy ray curing monomer and/or an active energy ray curing oligomer; (B) a photopolymerization initiator; and (C) a surface tension adjusting agent, and
having a viscosity of 4.5 to 9.0 mPa·s at 25° C., and a viscosity of 3.0 to 6.0 mPa·s at 35° C.

2. The ink according to claim 1, wherein a surface tension is 19 to 33 mN/m.

3. The ink according to claim 1, containing at least not less than 50 wt % of (A) the active energy ray curing monomer having a viscosity of 2.0 to 8.0 mPa·s at 25° C.

4. The ink according to claim 1, further containing a colorant, and having colored transparency or colorless transparency.

5. A printed product formed by forming an image or a coating film on a substrate by using active energy ray curing inkjet ink cited in claim 1, and irradiating the image or the coating film with an active energy ray.

6. An inkjet printing apparatus comprising:
a conveyance element that conveys a substrate;
an inkjet head that ejects active energy ray curing inkjet ink from nozzles toward the substrate conveyed by the conveyance element, the active energy ray curing inkjet ink containing components (A) to (C) below:
(A) an active energy ray curing monomer and/or an active energy ray curing oligomer;
(B) a photopolymerization initiator; and
(C) a surface tension adjusting agent, and having a viscosity of 3.0 to 6.0 mPa·s at 35° C.; and
an active energy source that irradiates, with an active energy ray, the substrate coated with the active energy ray curing inkjet ink ejected from the inkjet head, while holding a temperature at 35° C. to 40° C. when the active energy ray curing inkjet ink is ejected from the inkjet head.

7. The apparatus according to claim 6, wherein
the inkjet head is arranged above the conveyance element, and
the nozzles are arranged in a line in a direction perpendicular to a conveyance direction of the substrate conveyed by the conveyance element.

8. An inkjet printing method comprising:
conveying a substrate by a conveyance element;
ejecting active energy ray curing inkjet ink toward the substrate conveyed by the conveyance element by using an inkjet head including nozzles facing the substrate, the active energy ray curing inkjet ink containing components (A) to (C) below:
(A) an active energy ray curing monomer and/or an active energy ray curing oligomer;
(B) a photopolymerization initiator; and
(C) a surface tension adjusting agent, and having a viscosity of 4.5 to 9.0 mPa·s at 25° C. and a viscosity of 3.0 to 6.0 mPa·s at 35° C.;
coating the substrate with the active energy ray curing inkjet ink; and
curing the active energy ray curing inkjet ink by irradiating the substrate coated with the active energy ray curing inkjet ink with an active energy ray.

9. A method according to claim 8, further comprising:
forming a uniform coating film made of the active energy ray curing inkjet ink on the substrate.

10. The ink according to claim 1, wherein a relationship between a surface tension $[X]$ mN/m of a substrate and the surface tension $[Y]$ mN/m of the active energy ray curing inkjet ink is represented by the following expression:

$1.0 < [X] - [Y] < 15.0$ mN/m.

* * * * *